United States Patent [19]

Namizuka

[11] Patent Number: 5,287,203
[45] Date of Patent: Feb. 15, 1994

[54] APPARATUS FOR ENCODING AND DECODING INFORMATION ON RECORDING MEDIUM

[75] Inventor: Yoshiyuki Namizuka, Yokohama, Japan

[73] Assignee: Ricoh Company, Ltd., Japan

[21] Appl. No.: 5,112

[22] Filed: Jan. 15, 1993

[30] Foreign Application Priority Data

Jan. 17, 1992 [JP] Japan .................... 4-006799

[51] Int. Cl.⁵ .............................. H04N 1/40
[52] U.S. Cl. ....................... 358/443; 358/444; 358/401; 358/448; 358/451; 358/450; 348/409
[58] Field of Search ............... 358/443, 404, 444, 426, 358/427, 261.1–261.4, 262.1, 474, 401, 448, 451, 450, 133, 135, 136; 382/56

[56] References Cited

U.S. PATENT DOCUMENTS

| | | | |
|---|---|---|---|
| 4,591,908 | 5/1986 | Hirano | 358/136 |
| 5,010,401 | 4/1991 | Murakami et al. | 358/136 |
| 5,168,374 | 12/1992 | Morimoto | 382/56 |

FOREIGN PATENT DOCUMENTS

3-123988  5/1991  Japan .............. G06K 7/10

Primary Examiner—Edward L. Coles, Sr.
Assistant Examiner—Jerome Grant, II
Attorney, Agent, or Firm—Mason, Fenwick & Lawrence

[57] ABSTRACT

An image processing apparatus includes: a reading part for optically reading an image from an original image on a recording medium; a conversion part for converting the read-out image into a digital image; a first storage part for storing the digital image; an input part for inputting an instruction and a password number; an encoding part for transforming the digital image to an encoded image when an encoding process for the digital image is selected according to the instruction; a decoding part for transforming the digital image to a decoded image when a decoding process for the digital image is selected according to the instruction, a second storage part for storing the encoded image in accordance with a memory address determined based on the password number when the encoding process is selected, and for storing the decoded image in accordance with the memory address determined based on the password number when the decoding process is selected, and an output part for outputting either the encoded image or the decoded image onto a recording medium so that either an image encoded from the original image or an image decoded from the encoded image is recorded.

11 Claims, 12 Drawing Sheets

111 DETECT LINES OF INPUT IMAGE
112 SAMPLE HORIZONTAL LINES
113 SAMPLE VERTICAL LINES
114 DETECT FRAME LINE
115 OBTAIN GRADIENT TO HORIZONTAL LINE
116 OBTAIN GRADIENT TO VERTICAL LINE
117 CORRECT LINE DIRECTIONS

APPARATUS FOR ENCODING AND DECODING INFORMATION ON RECORDING MEDIUM

BACKGROUND OF THE INVENTION

The present invention generally relates to reproduction of bit information on a recording medium, and more particularly to an image processing apparatus for transforming bit information on a recording medium to encoded data and for transforming the encoded data to decoded data, so that a reconstructed data from the encoded data is recorded on a recording medium.

There is an information reproducing device which is of the type relevant to the present invention. Japanese Laid-Open Patent Publication No.3-123988 discloses this information reproducing device for reproducing data from original bit information recorded on a recording medium so that reproduced data of characters, pictures, or sound is recorded on a recording medium. The device disclosed in this publication relates to correct and precise reproduction of bit array information on a recording medium.

In the case of the information reproducing device mentioned above, a sequence of codes or bit array information of character, picture or sound data is recorded on a sheet-like recording medium, and it can be easily read by an optical reader. The data on the recording medium is transmitted from an information reproducing device to another information reproducing device via the existing mailing system. On reception of the data by the receiving device, the code sequence of the original data of characters, pictures, or sound is reproduced. In order to increase the performance and operability of the device, start data, end data and identification data are added to the code sequence of the original data, and such composite data is transmitted and received.

However, in the conventional device disclosed in the above mentioned publication, the receiving device can easily reproduce the bit information when the data of the bit information is received from the transmitting device, even if the data of the bit information is confidential. That is, in the above mentioned publication, there is no disclosure of a technique for preventing the leakage of the confidential data of the bit information to an unauthorized person.

There are other techniques relevant to the apparatus according to the present invention. A data encoding method appropriate for transmitting and receiving data of facsimile communications is disclosed in a transaction of the Institute of Picture and Communication Engineers of Japan, vol.17, No.6, 1988, entitled "Confidential Data protective Facsimile Communication Method Using A Scramble Technique". A data encoding method appropriate for digital images is disclosed in a transaction of the Institute of Electronics and Communication Engineers of Japan, 86/11 vol.1, J69-B No.11, entitled "A Technique of Data Encoding Appropriate For Digital Images".

In the cases of the above mentioned methods, the encoding process is carried out for data of digital signals only. However, there is no disclosure of handling of a recording medium on which bit information is recorded in order for the encoding and decoding of the bit information on the recording medium. That is, in the above mentioned methods, there is no disclosure of a device for transforming bit information on a recording medium to encoded data, and for transforming the encoded data to decoded data to record the reconstructed data on a recording medium.

SUMMARY OF THE INVENTION

Accordingly, it is a general object of the present invention to provide an improved image processing apparatus in which the above described problems are eliminated.

Another, more specific object of the present invention is to provide an image processing apparatus in which confidential data of bit information recorded on a recording medium is reliably produced as encoded data, and it is reproduced from the recording medium, thereby preventing the leakage of the confidential data of the bit information to an unauthorized person. The above mentioned object of the present invention is achieved by an image processing apparatus which includes a reading part for optically reading an image from an original image on a recording medium, a conversion part for converting the read-out image of the reading part into a digital image, a first storage part for storing the digital image from the conversion part, an input part for inputting an instruction and a password number, the instruction indicating whether an encoding process or a decoding process is to be performed for the digital image, an encoding part for transforming the digital image, stored in the first storage part, to an encoded image when the performing of the encoding process for the digital image is selected according to the instruction of the input part, a decoding part for transforming the digital image, stored in the first storage part, to a decoded image when the performing of the decoding process for the digital image is selected according to the instruction of the input part, a second storage part for storing the encoded image in accordance with a memory address determined based on the password number from the input part when the performing of the encoding process is selected, and for storing the decoded image in accordance with the memory address determined based on the password number from the input part when the performing of the decoding process is selected, and an output part for outputting either the encoded image or the decoded image, stored in the second storage part, onto a recording medium so that either an image encoded from the original image or an image decoded from the encoded image is recorded. According to the present invention, by utilizing simple construction and known techniques, confidential data of bit information on a recording medium can be reliably produced and reproduced. It is possible to prevent the leakage of the confidential data to an unauthorized person.

Other objects and further features of the present invention will become apparent from the following detailed description when read in conjunction with the accompanying drawings.

DESCRIPTION OF THE PREFERRED EMBODIMENTS

First, a brief description will be given of an embodiment of the image processing apparatus according to the present invention. Briefly, in the image processing apparatus of the present invention, an original image is optically read by an image reader, and the read-out image is transformed to an encoded image, so that the encoded image is recorded on a sheet-like recording medium. In the image processing apparatus of the present invention, an encoded image is optically read by the image reader from the recording medium, and the read-out image is transformed to a decoded image, so that the decoded image is recorded on a recording medium.

Figure 1:
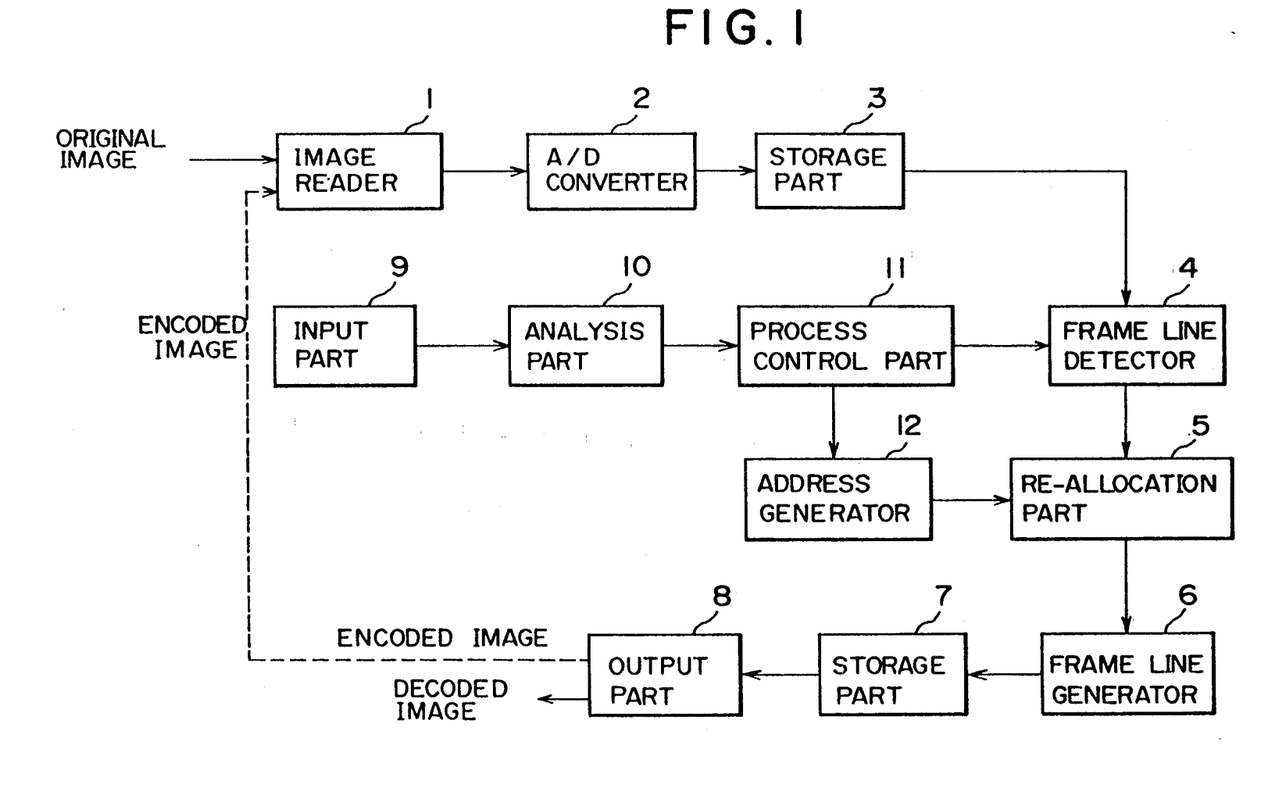
FIG.1 is a block diagram showing a preferred embodiment of an image processing apparatus according to the present invention.
Figure 2:
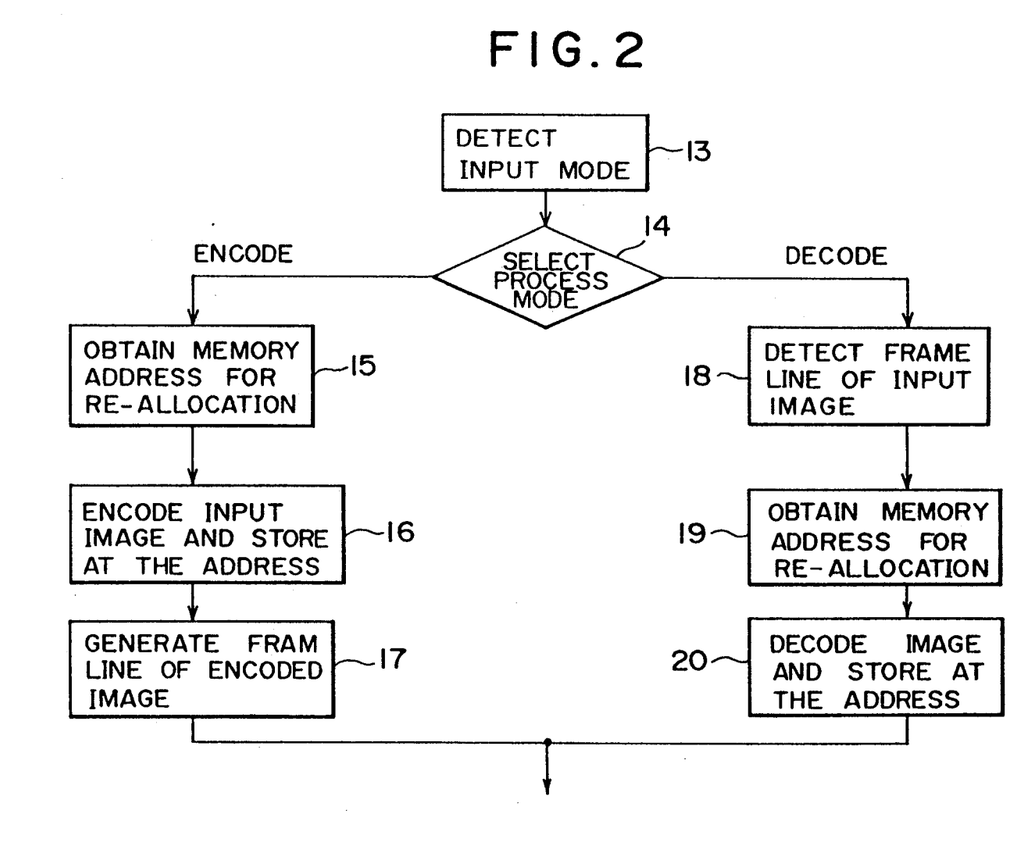
FIG.2 is a flow chart for explaining main encoding and decoding processes performed by the apparatus shown in FIG.1.

Referring to FIGS. 1 and 2, the construction of an embodiment of the image processing apparatus according to the present invention and the main encoding and decoding processes performed by the apparatus will now be described.

An image (which is to be encoded or decoded) is read by an image reader 1 of the apparatus shown in FIG. 1 from a sheet of an original image (or a sheet-like recording medium on which the image is recorded. The image reader 1 outputs a signal indicating the input image read from the sheet, and this signal is converted by an analog-to-digital (A/D) converter 2 into a digital signal. The digital signal from the A/D converter 2 is stored by a storage part 3 in a memory of the storage part.

A mode selection instruction and a password number are input by an operator, from an input part 9, to the image processing apparatus. An analysis part 10 analyzes the content of the input data from the input part 9. The analysis part 10 detects whether an encoding process mode or a decoding process mode is selected according to the input mode selection instruction. In accordance with the result of the analysis by the analysis part 10, a process control part 10 selects either the encoding process mode or the decoding process mode, so that a process of the selected mode is carried out by the apparatus.

When the encoding process for the input image is performed, an address generator 12 performs a prescribed arithmetic and logic operation based on the password number from the input part 9, and produces an address of the memory of the storage part 3 at which encoded image data is to be stored or located. The arithmetic and logic operation is performed according to a known technique such as a multiple-term equation solution method.

In accordance with the address of the memory obtained by the address generator 12, each item of in-process data (block data, pixel data, or line data) of the input image used in the encoding process is transferred from the stored portion (input address) of the memory of the storage part 3. After the input image is transformed to an encoded image, the processed data is transferred to the address (output address) of the memory of the storage part 3 produced by the address generator 12.

When the input image is encoded, a re-allocation part 5 transforms the in-process data of the input image to an encoded image by performing the encoding process for each item of the in-process data (the block data, the pixel data, or the line data) of the input image. The re-allocation part 5 transfers the processed data of the input image to the memory of the storage part 3 at the address thereof generated by the address generator 12. This procedure is called re-allocation of data. At a result of the re-allocation, the data previously stored at an address of the memory is replaced with the processed data, and the address of the memory corresponds to the address generated by the address generator. Thus, the re-allocation part 5 produces an encoded image at appropriate areas of the memory of the storage part 3.

A frame line generator 6 of the apparatus shown in FIG. 1 generates a frame line of the encoded image from the re-allocation part 5, the frame line surrounding the area of the encoded image produced by the re-allocation part 5. The horizontal and vertical directions of the area of the encoded image are defined by the frame line produced by the frame line generator 6.

The processed image (the encoded image) from the memory of the storage part 3 is stored in a memory of a storage part 7 in accordance with the address of the memory determined by the address generator 10 based on the input password number. The image data stored in the memory of the storage part 7 is output by an output part 8, so that the processed image is recorded on a recording medium.

In the meantime, when the decoding process mode is selected by the process control part 11, a frame line detector 4 detects the frame line of the area of the input image (the encoded image) so as to recognize the horizontal and vertical directions of the area of the input image, so that the re-allocation part 5 can correctly carry out the re-allocation of the data of the input image.

When the decoding process mode is selected, the address generator 12 produces an address of the memory of the storage part 3 by performing a prescribed arithmetic and logic operation based on the password number from the input part 6. The re-allocation part 5 takes the address of the memory produced by the address generator 12 as being the location of the memory of the storage part 3 at which processed image data (transformed from the input image data) is stored or located.

In accordance with the address of the memory obtained by the address generator 12, each item of the in-process data of the input image used in the decoding process is transferred by the re-allocation part 5 from the stored location (the input address) of the memory of the storage part 3 from the A/D converter 2. After the input image is transformed to a decoded image by the re-allocation part 5, the processed image data is transferred to the address (the output address) of the memory of the storage part 3 obtained by the address generator 12.

After the processed image data is re-allocated by the re-allocation part 5, the frame line generator 6 merely passes through the processed image data. The storage part 7 stores the processed image data from the memory of the storage part 3 in the memory of the storage part 7 in accordance with the memory address determined by the address generator 12 based on the input password number. The image data stored in the memory of the storage part 7 is output by the output part 8, so that the processed image data is printed on a recording medium.

FIG.2 shows the main encoding and decoding processes performed by the apparatus shown in FIG.1. In step 13 of the flow chart shown in FIG.2, the mode selection instruction and the password number are analyzed. Step 14 detects whether the encoding process mode or the decoding process mode is selected according to the mode selection instruction.

When the encoding process mode is selected, the steps 15 through 17 are performed. Step 15 generates an address of the memory of the storage part 3 based on the password number, the generated address of the memory being used for the re-allocation of the in-process data by the re-allocation part 5. Step 16 encodes the input image and stores the encoded image in the memory of the storage part 3 at the address of the memory being produced by the address generator 12. Step 17 generates a frame line of the encoded image in the memory of the storage part 3, which line surrounds the area of the encoded image data in the memory of the storage part 3.

When the decoding process mode is selected in steps 13 and 14, the steps 18 through 20 are performed. Step 18 detects the frame line of the input image so as to recognize the horizontal and vertical lines of the area of the encoded image data in the memory of the storage part 3. Step 19 generates an address of the memory of the storage part 3 based on the password number, the memory address being used for the re-allocation of the in-process data by the re-allocation part 5. Step 20 decodes the input image and stores the decoded image data in the memory of the storage part 3 at the address thereof produced by the address generator 12.

As described above, bit information recorded on a recording medium is encoded and decoded in accordance with the input mode selection instruction and password number, and it is possible to reliably produce and reproduce confidential data of the image recorded on the recording medium.

Figure 3A:
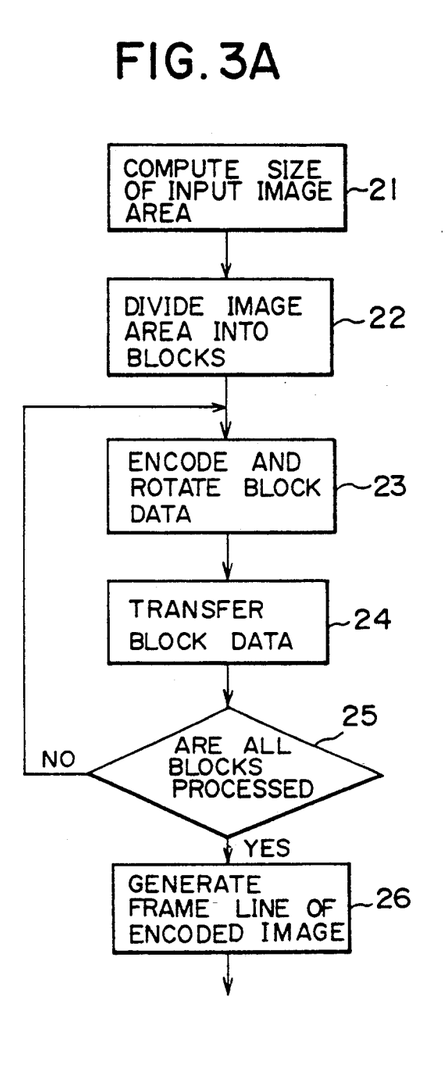
FIGS.3A and 3B are diagrams for explaining a blockwise encoding process performed by the apparatus shown in FIG.1.
Figure 3B:
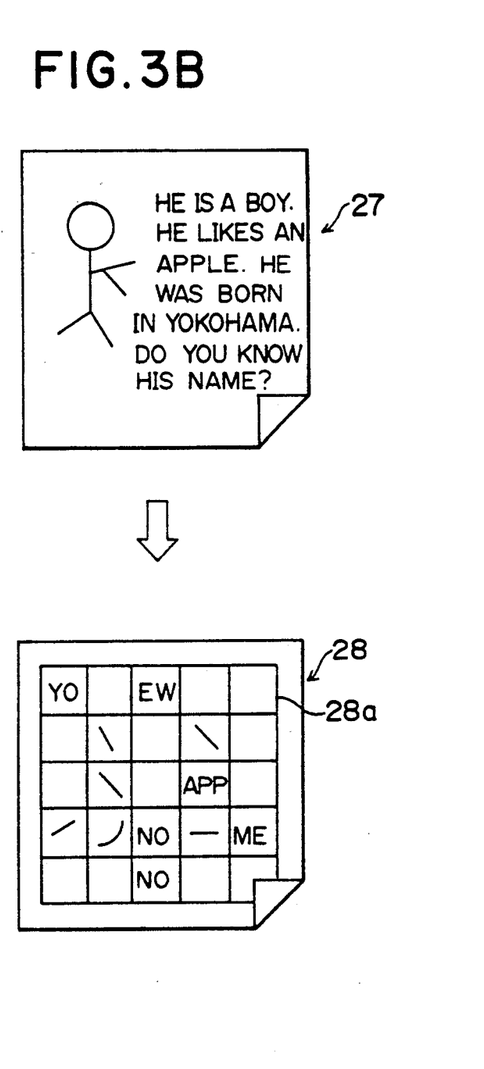

FIG.3A shows a block-wise encoding process performed by the apparatus shown in FIG.1. Step 21 of this process shown in FIG.3A computes the size of an area of an input image 27, as shown in FIG.3B, which area of the image is transformed to an encoded image. Step 22 divides the image data being read from the input image 27 into a number of blocks. The size of each block is a preset block size, or it can be selected by inputting a block size value through the input part 9.

Step 23 transforms each block of the image data into a block of encoded image data, and rotates each block of the encoded image data in accordance with the result of the arithmetic and logic operation based on the password number. Step 24 transfers the block of the encoded image data to an address of the memory of the storage part 7, the address computed by the address generator 12. Step 25 detects whether or not the block having been processed is the final block of the input image produced in step 22. Thus, the steps 23 and 24 are repeatedly performed until the final block data of the input image has been processed.

After all the blocks of the input image data are processed, step 26 generates a frame line 28a which surrounds all the blocks of the image data having been encoded and rotated. The encoded image and the frame line are stored in the memory of the storage part 7 at a memory address determined based on the input password number of the input part 9.

In the block-wise encoding process described above, each block of the input image from the original image is encoded and rotated, and it is possible to roughly produce confidential data of bit information on a recording medium. The size of each block of the encoded image 28 shown in FIG.3B is enlarged for the ease of explanation. By reducing the block size, it is possible to prevent the leakage of the confidential data to an unauthorized person.

Figure 4A:
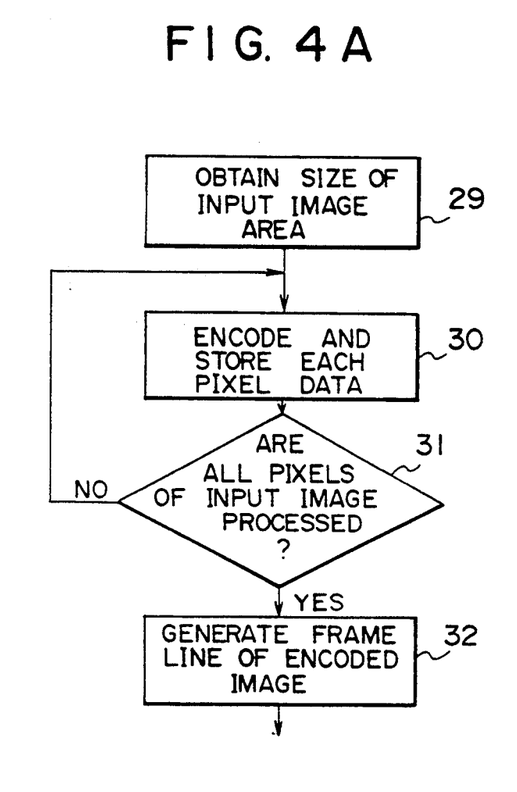
FIGS. 4A and 4B are diagrams for explaining a pixelwise encoding process performed according to the present invention.

FIG.4A shows a pixel-wise encoding process performed by the apparatus shown in FIG.1. Step 29 of the process shown in FIG.4A computes the size of an area of an input image (an original image 33 shown in FIG.4B), which area should be encoded.

Step 30 transforms each pixel of the input image to an encoded pixel data, and stores the encoded pixel in the memory of the storage part 7 at the memory address determined by the address generator 12 based on the password number of the input part 9. Step 31 detects whether or not all the pixel data in the area of the input image has been processed. Thus, step 30 is repeatedly performed until the final pixel of the input image has been processed.

Figure 4B:
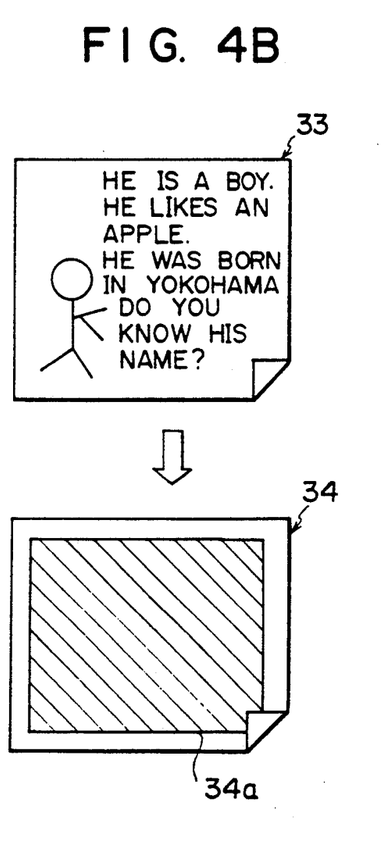

After all the pixel data of the input image have been processed (the encoded image is indicated by a reference numeral 34 in FIG.4B), step 32 generates a frame line 34a (a solid line as shown in FIG.4B) which surrounds the whole area of the encoded image 34. The encoded image 34 and the frame line 34a are stored in the memory of the storage part 7 at the memory address determined based on the input password number.

In the pixel-wise encoding process described above, each pixel data of the input image from the original image is encoded and the encoded pixel data is stored, and it is possible to quickly and reliably produce the confidential data of the information on the recording medium. The encoded image 34 on a recording medium shown in FIG.4B is not easily readable to an unauthorized person, and thus it is possible to prevent the leakage of the confidential data to the outsider.

Figure 5A:
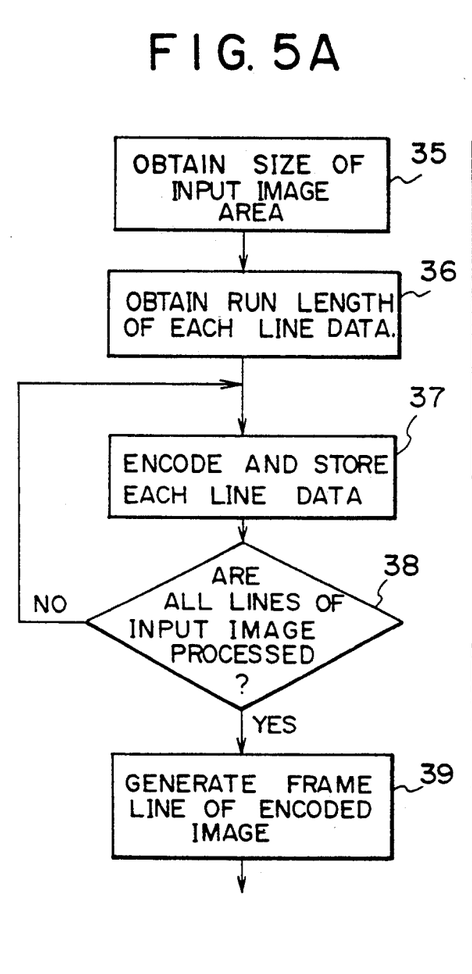
FIGS. 5A and 5B are diagrams for explaining a run-length encoding process performed according to the present invention.

FIG.5A shows a run-length encoding process performed by the apparatus shown in FIG.1. Step 35 of the run-length encoding process shown in FIG.5A obtains the size of an area of an input image (an original image 40 shown in FIG.5B), which area of the image is transformed to an encoded image. Step 36 obtains run-length data for each line of the read-out image from the input image, so as to determine ranges in each line of the input image in which the same pattern of pixel data is repeatedly found.

Step 37 transforms line data of the image into encoded image data, and stores each line of the encoded image in the memory of the storage part 7 in accordance with the memory address from the address generator 12. Step 38 detects whether or not all the line data of the input image has been processed in step 37. Thus, the step 37 is repeatedly performed until the final line of the input image has been processed.

Figure 5B:
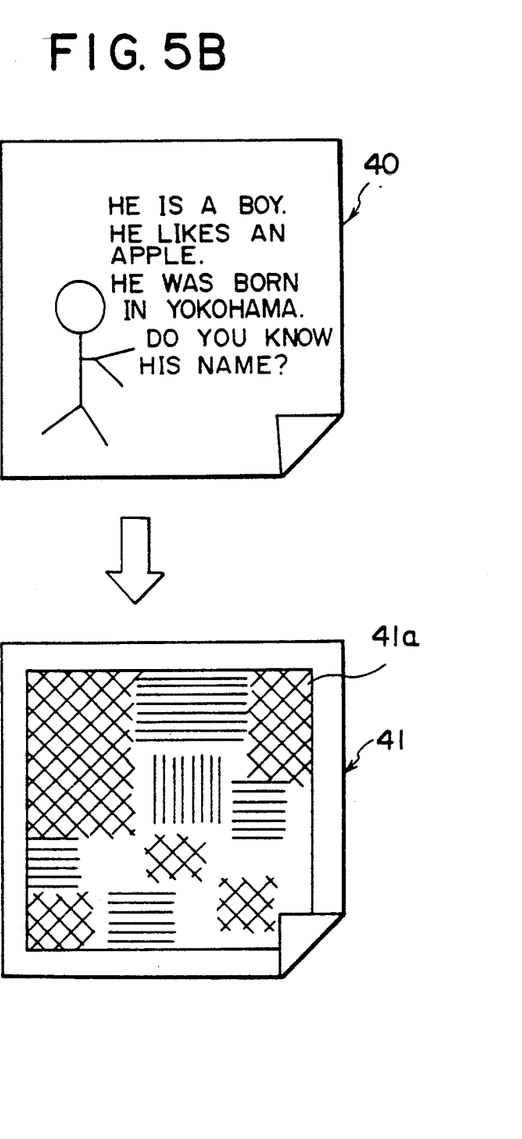

After all the line data of the input image are processed, step 39 generates a frame line 41a (indicated by a solid line in FIG.5B) which surrounds the area of the image data having been encoded and stored. The encoded image 41 with the frame line 41a, as shown in FIG.5B, is stored in the memory of the storage part 7 at the memory address determined based on the input password number.

In the run-length encoding process described above, each line data of the input image is encoded and the encoded line data is stored, and it is possible to quickly and reliably produce the confidential data of the input image on the recording medium. The encoded image 41 on the recording medium, as shown in FIG.5B, is not easily readable to an unauthorized person, and it is possible to prevent the leakage of the confidential data.

Next, a description will be given, with reference to FIGS.6A and 6B, of a multilevel image encoding process performed by the apparatus shown in FIG.1. By performing this process, an encoded image 68 and a frame line 68a as shown in FIG.6B are produced from an input multilevel image 67 as shown in FIG.6B.

Figure 6A:
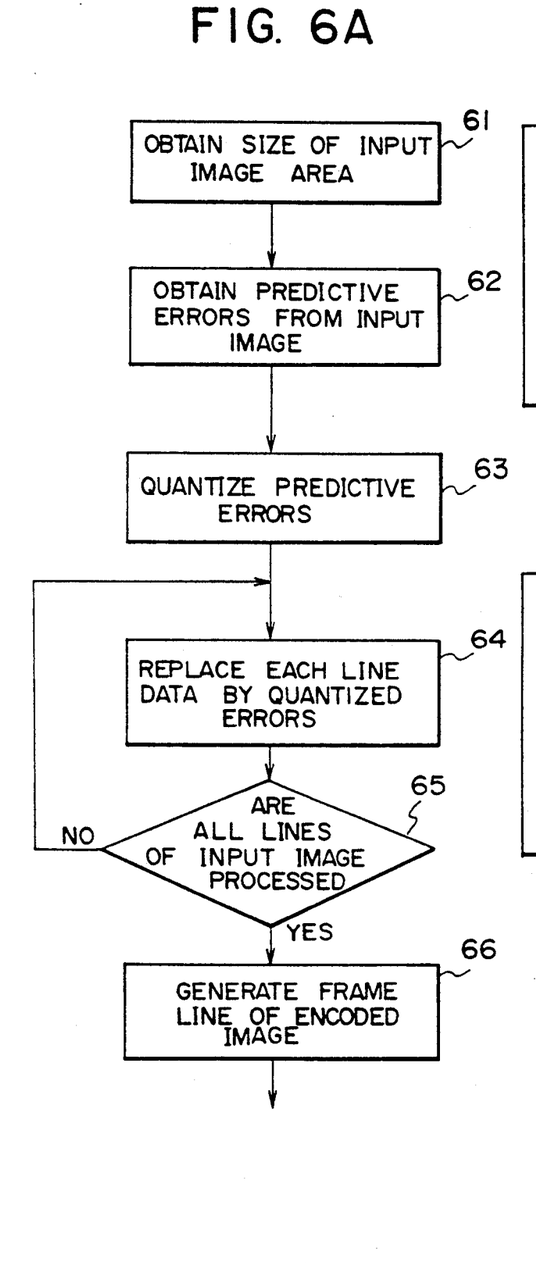
FIGS. 6A and 6B are diagrams for explaining a multilevel image encoding process performed according to the present invention.

Step 61 of the process shown in FIG.6A obtains the size of the whole area of the input image 67 to be encoded. Step 62 obtains predictive errors of the input image through a known forward discrete cosine transforming process. Step 63 quantizes the predictive errors so that a set of quantized predictive errors of the input image is produced.

Step 64 replaces each line of the input image by the quantized errors corresponding to the line data, and stores the data of the quantized errors in the memory of the storage part 7 for each line. Step 65 detects whether or not all the lines of the input image have been processed in step 64. Therefore, step 64 is repeatedly performed until the final line of the input image has been processed. The data of the quantized errors for the input image stored in the memory of the storage part 7 is the encoded image 68 shown in FIG.6B.

Figure 6B:
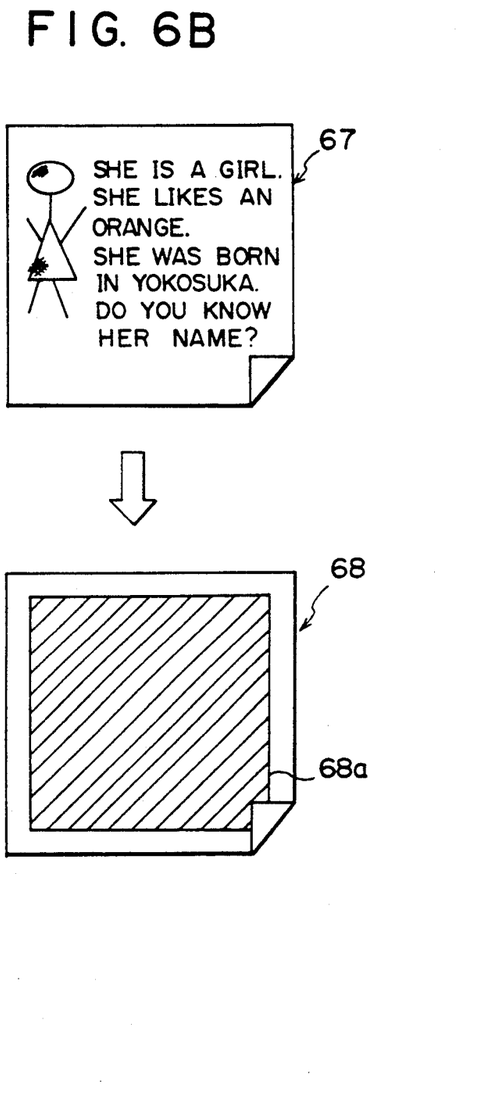

Step 66 generates the frame line 68a surrounding the whole area of the encoded image 68, as shown in FIG.6B, so that the encoded image 68 and the frame line 68a are stored in the memory of the storage part 7.

In the multilevel image encoding process described above, each line of the input multilevel image is transformed to the quantized predictive errors, and it is possible to quickly and reliably produce confidential data of the image (the compressed image). The encoded image 68 printed on the recording medium, as shown in FIG.6B, is not at all readable to an unauthorized person, and it is possible to prevent the leakage of the confidential data to an unauthorized person, according to the present invention.

Figure 7A:
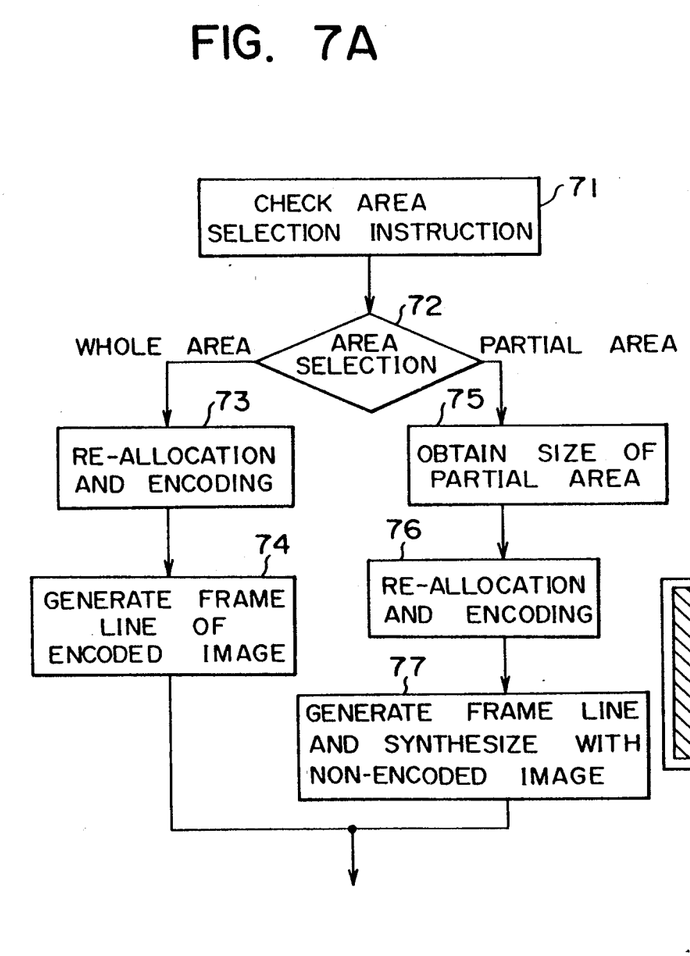
FIGS. 7A and 7B are diagrams for explaining a selective encoding process performed according to the present invention to selectively encode the whole area of the input image and a partial area of the input image.
Figure 7B:
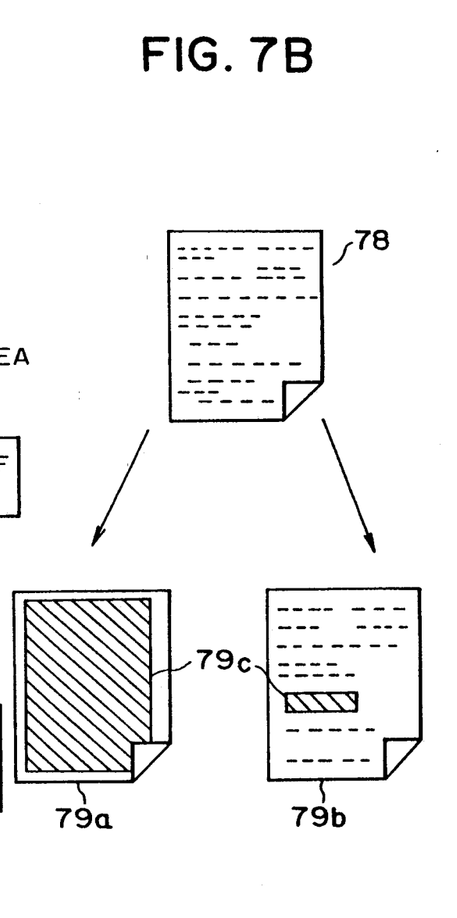

FIGS.7A and 7B show a selective encoding process according to the present invention to selectively encode the whole area of the input image and a partial area of the image. An area selection instruction is additionally input from the input part 9 to the apparatus shown in FIG.1, together with the mode selection instruction and the password number. In accordance with the input area selection instruction, the encoding for either the whole area of the input image or the partial area thereof is selected. However, it is a matter of course that another area selecting method (for example, a method employing a tablet) can be used to accomplish the function which is the same as that described above.

Step 71 of the process shown in FIG.7A checks the input area selection instruction from the input part 9. Step 72 detects whether the performing of encoding the whole area of the input image or the performing of encoding a partial area thereof is selected according to the input area selection instruction.

When the whole area encoding is selected in step 72, steps 73 and 74 are performed. Step 73 carries out the re-allocation and encoding process as shown in FIGS.3 through 6 for the whole area of the input image 78, so that an encoded image 79a as shown in FIG.7B is produced for the whole area of the input image 78. Step 74 generates a frame line 79c (a solid line) surrounding the whole area of the encoded image, as shown in FIG.7B, so that the encoded image 79a and the frame line 79c are stored in the memory of the storage part 7.

When the partial area encoding is selected in step 72, steps 75 through 77 are performed. Step 75 obtains the size of the partial area of the input image. Step 76 carries out the re-allocation and encoding process as shown in FIGS.3 through 6 for the partial area of the input image 78, so that an encoded image is produced for the selected partial area of the input image 78. Step 77 generates a frame line 79c (a solid line) surrounding the partial area of the encoded image, as shown in FIG.7B. Step 77 also synthesizes the encoded image of the selected area with a non-encoded image of the remaining area, so that a composite image 79b, including the encoded image surrounded by the frame line 79c and the non-encoded image, as shown in FIG.7B, are stored in the memory of the storage part 7 at the memory address determined based on the password number.

In the selective encoding process described above, it is possible to encode only the partial area of the input image. It is possible to reliably produce the confidential data of the partial area of the input image according to the area selection instruction, without harming the quality of the non-encoded image of the remaining area.

Next, a description will be given, with reference to FIGS.8A and 8B, of a synthesizing process for a plurality of encoded images and a separating process for a synthesized image performed according to the present invention.

Figure 8A:
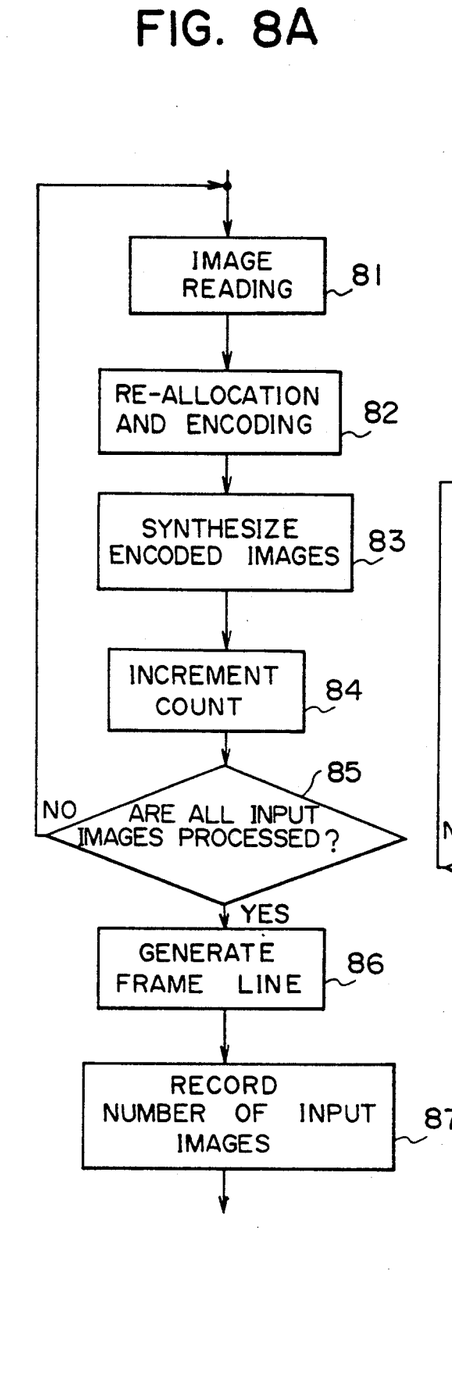
FIGS. 8A and 8B are diagrams for explaining a synthesizing process for a number of encoded images and a separating process for a synthesized image.

Step 81 of the synthesizing process shown in FIG.8A reads each input image among a plurality of input images each of which is to be transformed to an encoded image, and stores each input image in the memory of the storage part 3. Step 82 carries out the re-allocation and encoding process as shown in FIGS.3 through 6 for each input image, so that an encoded image and a frame line surrounding the area of the encoded image are produced for each input image.

Step 83 synthesizes each newly encoded image with previously encoded images by performing an Exclusive-OR operation in accordance with the input password number, the total number of the input images, and the sequence number of each input image, so that a composite image is produced. Step 84 increments a count indicating the number of the processed input images within the composite image. Step 85 detects whether or not the count reaches the total number of the input images, that is, whether or not all the input images are processed. Steps 8 through 84 are repeatedly performed until the count reaches the total number of the input images.

Step 86 generates a frame line surrounding the area of the composite image thus produced. Step 87 records or prints the total number of input images outside the frame line surrounding the area of the composite image.

Figure 8B:
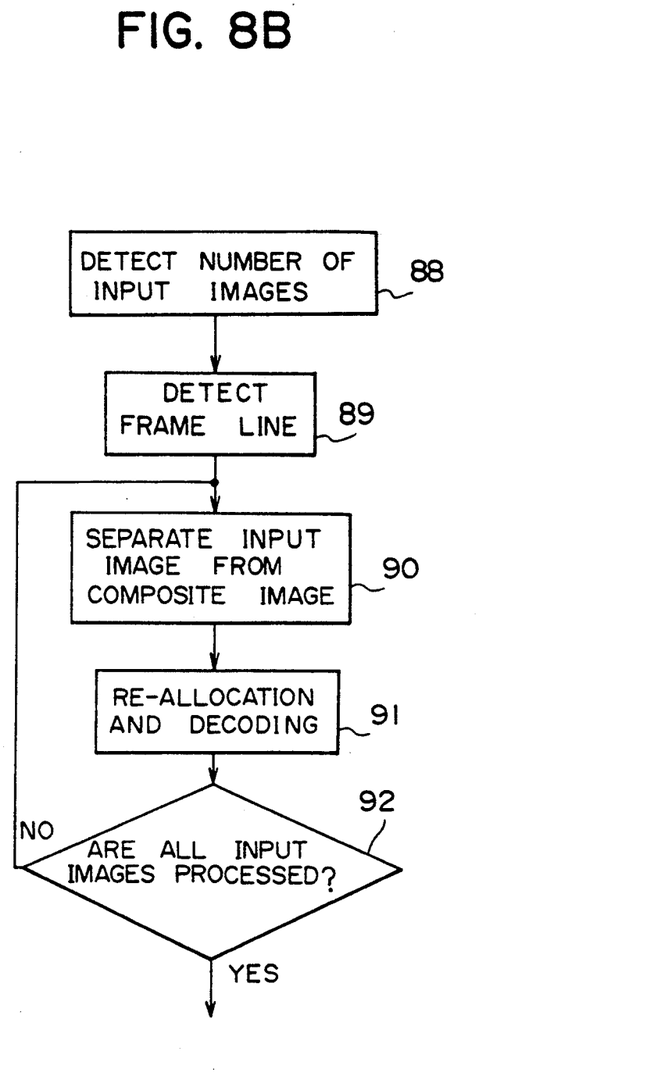

In the separating process shown in FIG.8B, step 88 detects the total number of input images included within the input image that is a composite image produced through the above steps 81–87 shown in FIG.8A. Step 89 detects the frame line of the composite image, the frame line defining vertical and horizontal directions of the area of the composite image.

Step 90 separates an input image from the composite image in accordance with the input password number, the total number of the input images, and the sequence number of each input image. Step 91 carries out the re-allocation and decoding process for each input image, so that each input image is transformed to a reconstructed image (or decoded image). Step 92 detects whether or not all the input images in the composite image are processed. Thus, steps 90 and 91 are repeatedly performed until all the input images in the composite image are transformed to reconstructed or decoded images.

In the synthesizing and separating processes described above, it is possible to encode and synthesize a plurality of input images to create a composite image. It is possible to produce a plurality of confidential data of input images in a recording medium with high density of data.

Next, a description will be given, with reference to FIGS.9A to 9C, of a synthesizing process for an encoded image and a non-encoded image to produce a composite image, and of a separating process for the composite image. By performing the synthesizing process shown in FIG.9A, an input image 94 shown in FIG.9C is transformed to an encoded image, and data of the encoded image is stored in the memory of the storage part 7 at the memory address based on a random number of a pseudo random number generator.

Figures 9A, 9B:
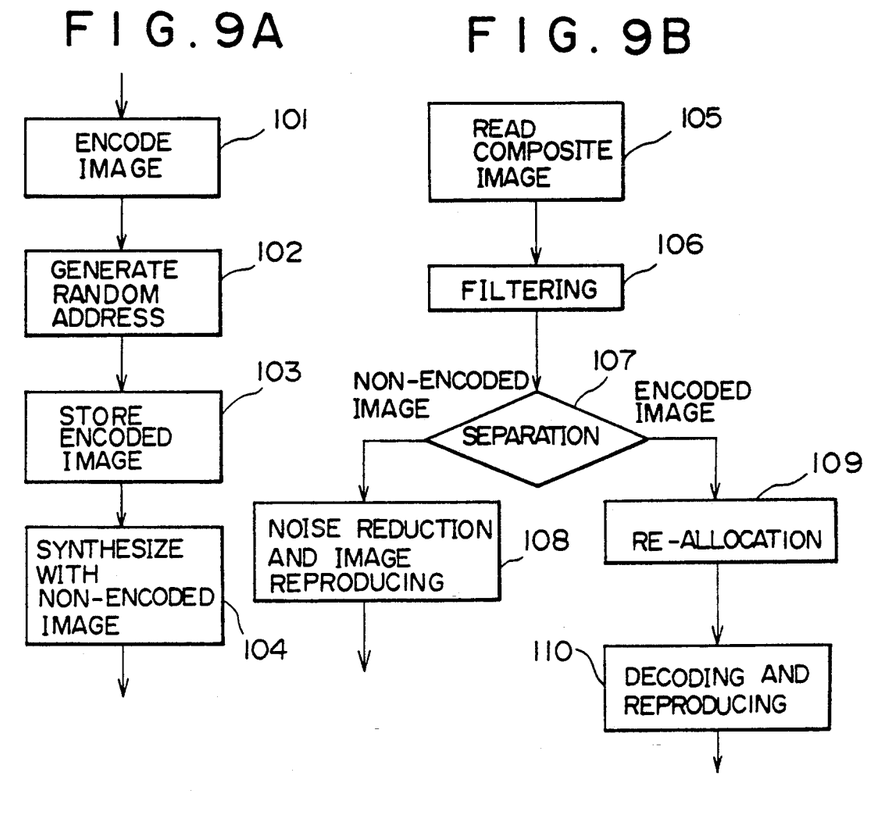
FIGS. 9A to 9C are diagrams for explaining a synthesizing process for an encoded image and a non-encoded image and a separation process for a synthesized image.
Figure 9C:
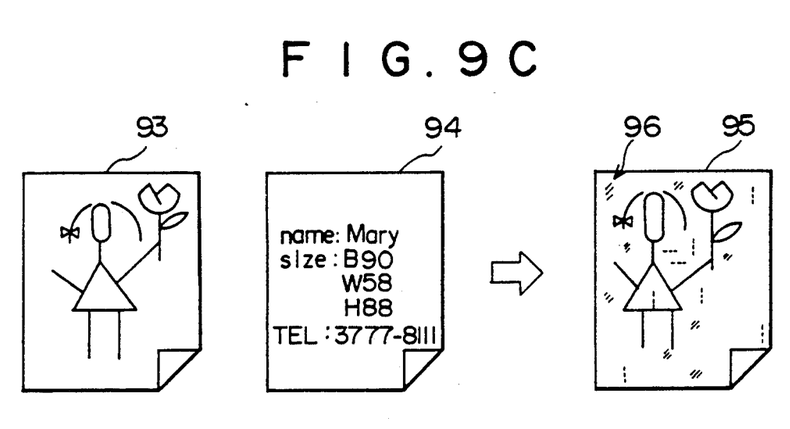

In the synthesizing process shown in FIG.9A, step 101 transforms an input image 94 shown in FIG.9C to an encoded image. Step 102 generates a random memory address by means of a pseudo random number generator (not shown in the drawings). Step 103 stores the encoded image in the memory of the storage part 7 at a memory location in accordance with the random memory address generated in step 102. Step 104 synthesizes the encoded image, stored in the memory of the storage part 9, with a non-encoded image 93 shown in FIG.9C in accordance with a disjunction of the two images, so that a composite image 95 with the encoded image 96 at the random memory address, as shown in FIG.9C, is produced.

In the separating process shown in FIG.9B, step 105 reads an input image that is a composite image 95 produced through the above steps 101–104. Step 106 performs a filtering of the input composite image 95 by means of a low-pass filter and a high-pass filter. Step 107 separates a non-encoded image 93 from the composite image 95 through the filtering of the low-pass filter, and separates an encoded image 94 therefrom through the filtering of the high-pass filter. Step 108 performs the noise reduction for the non-encoded image 93 and reproduces the non-encoded image 93 as shown in FIG.9C.

Step 109 carries out the re-allocation for the encoded image 94. Step 110 performs the decoding process for the encoded image 94 in accordance with the memory address of the pseudo random number generator, and stores, a decoded image 94 as shown in FIG.9C, in the memory of the storage part 7.

In the synthesizing and separating processes described above, it is possible that an encoded image 96 located at a random memory address is synthesized with a non-encoded image 93. Thus, it is possible to reliably prevent the leakage of the confidential data of the encoded image to an unauthorized person because of the presence of the non-encoded image in the composite image.

Figure 10A:
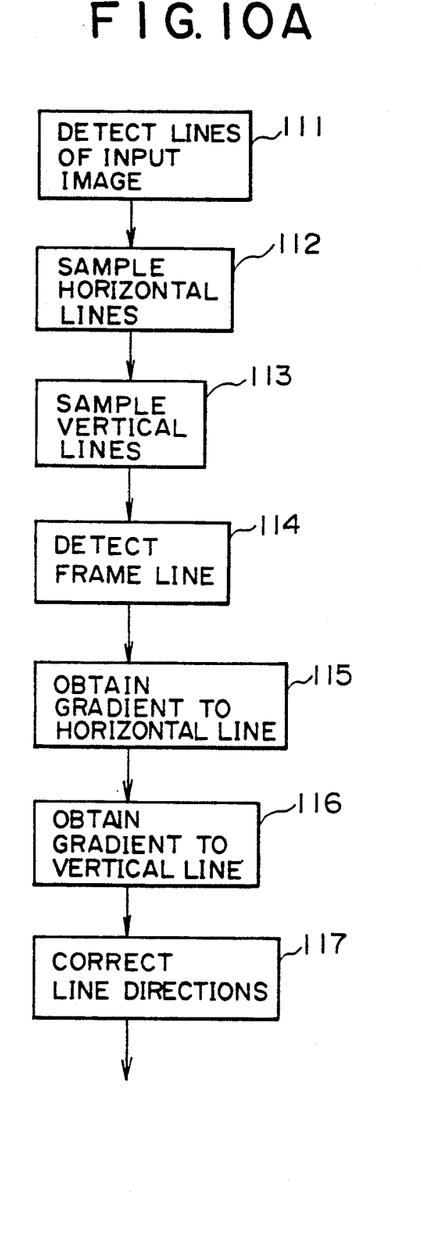
FIGS. 10A and 10B are diagrams for explaining an area detecting process to detect the area of an encoded image by using a frame line in the input image.
Figure 10B:
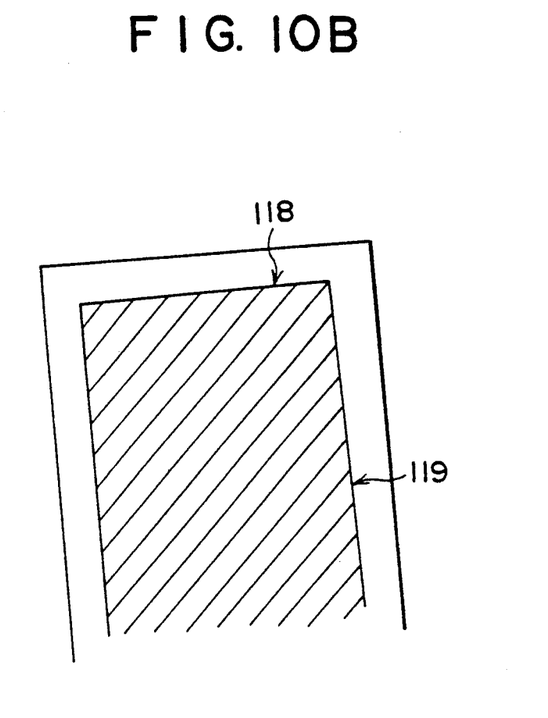

FIGS.10A and 10B show the area detecting process performed by the apparatus shown in FIG.1 to recognize an area of an input image (encoded and rotated) from a frame line of the input image, and detect vertical and horizontal directions of the input image. The area of the input image, as shown in FIG.10B, is surrounded by a solid line 118 (in the horizontal direction) and a solid line 119 (in the vertical direction) included in the frame line of the input image. Generally, it is necessary to correctly detect vertical and horizontal directions of the area of the input image, in order to perform the decoding process according to the present invention.

The input image (including lines such as the above mentioned lines 118 and 119) is read by the image reader 1 shown in FIG.1, and it is stored in the memory of the storage part 3. In step 111 of the process shown in FIG.-10A, the frame line detector 4 detects lines of the input image in accordance with the read-out digital image stored in the memory of the storage part 3. Step 112 samples horizontal lines (such as the line 118 in FIG.10B) of the input image from the read-out digital image data stored in the memory of the storage part 3. Step 113 samples vertical lines (such as the line 119 in FIG.10B) of the input image from the read-out digital image data stored in the memory of the storage part 3.

Step 114 detects a frame line surrounding the area of the input image, from the horizontal and vertical lines obtained in steps 112 and 113, so that the frame line detector 4 recognizes the memory address of the memory of the storage part 3 at which the frame line is stored. Step 115 obtains the gradient of the input image relative to the actual horizontal direction by performing a prescribed arithmetic operation in accordance with the data of the frame line stored in the memory of the storage part 3. Step 116 obtains the gradient of the input image relative to the actual vertical direction by performing a prescribed arithmetic operation in accordance with the data of the frame line stored in the memory of the storage part 3.

In accordance with the gradients determined in steps 115 and 116, step 117 carries out a shifting or rotating operation for the input image (encoded and rotated image), stored in the memory of the storage part, so that the inclined directions of the input image are corrected. The data of the input image after the area detecting process described above is performed is used in the decoding process performed by the address generator 12 and the re-allocation part 5. Therefore, according to the present invention, it is possible to correctly transform the input image (encoded and rotated) to a reconstructed image that is essentially the same as the original image.

In the image processing apparatus according to the present invention, it is possible to have an operator easily recognize the vertical and horizontal directions of a recording medium on which an encoded image is recorded or printed. It is also possible to have operator easily recognize that the encoded image printed on the recording medium is confidential data which cannot be decoded to a readable data or message unless a correct password number is input.

Figure 11:
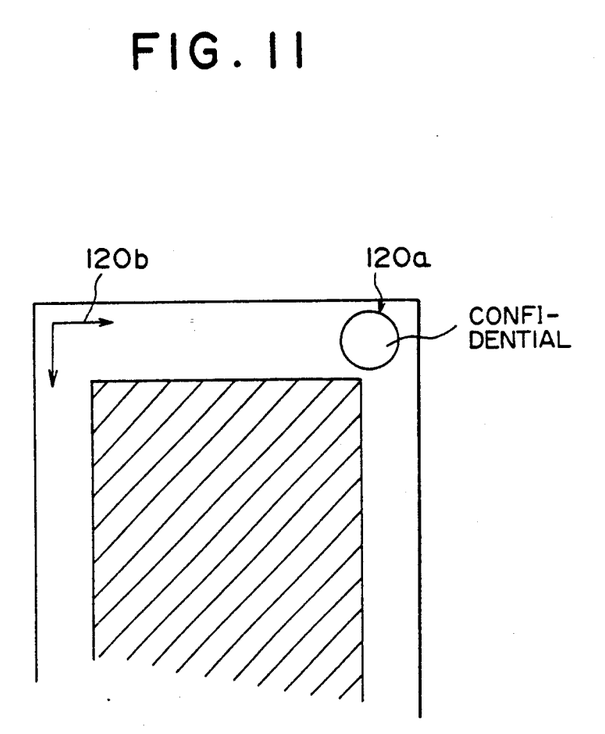
FIG. 11 is a diagram showing supplementary marking attached to a recording medium on which an encoded image is recorded.

The output part 8 of the apparatus shown in FIG.1 records a supplementary marking on a recording medium when the encoded image stored in the memory of the storage part 7 is output to the recording medium. As shown in FIG.11, an indicator mark 120a and a direction mark 120b are added by the output part 8 to the recording medium at the top-right corner thereof and at the top-left corner thereof when the encoded image is recorded on the recording medium. The data required for recording this supplementary marking is predetermined, and it is stored in the memory of the storage part 7 after the frame line is generated by the frame line generator 6 during the encoding process described above.

Therefore, viewing the direction mark 120b of the recording medium, an operator can place the recording medium in the image reader 1 of the apparatus in the correct reading direction for a decoding process performed for the encoded image thereon. Also, the indicator mark 120a serves to indicate to anyone that the data on the recording medium cannot be decoded unless the correct password number is input.

Figure 12A:
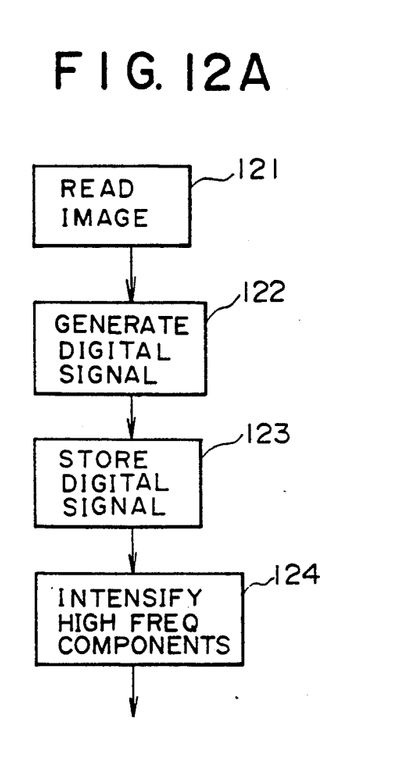
FIGS. 12A and 12B are diagrams for explaining a process for intensifying the high-frequency component of the input image which process is performed before the decoding process is performed.
Figure 12B:
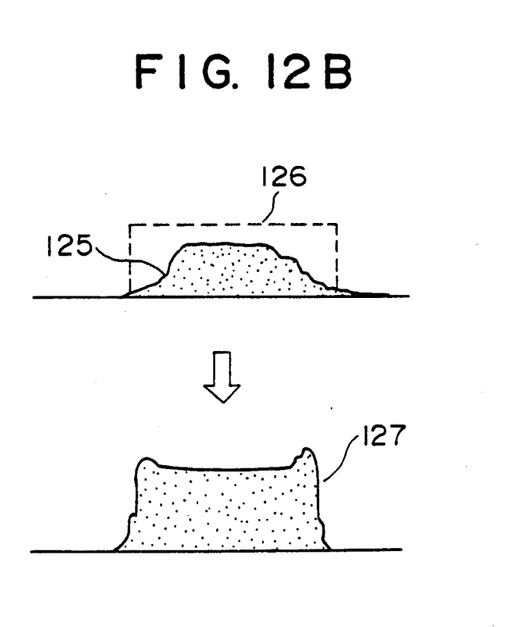

FIGS.12A and 12B show a process for intensifying the high-frequency component of the input image (encoded image). As shown in FIG.12B, generally, a high-frequency component 126 produced in the encoding process described above is omitted in an encoded image 125. The process shown in FIG.12A is performed to intensify the high-frequency component before the decoding process is performed.

Step 121 of the process shown in FIG.12A reads an input image on a recording medium by means of the image reader 1. Step 122 converts the analog signal from the reader 1 into a digital signal indicating the input image. Step 123 stores the digital signal in the memory of the storage part 3.

Step 124 samples signal change points and change quantities in vertical and horizontal directions of the input image by using a prescribed differential filter. In step 124, the encoded image 125 stored in the memory of the storage part 3 is synthesized with the signal change points and change quantities, so that an image 127 in which the high frequency components are intensified, as shown in FIG.12B, is reproduced.

The present invention is not limited to the above described embodiments, and variations and modifications may be made without departing from the scope of the present invention.

What is claimed is:

1. An apparatus for encoding and decoding information on a recording medium, said apparatus comprising:
reading means for optically reading out an image from an original image on a recording medium;
conversion means for converting said read-out image of said reading means into a digital image;
first storage means for storing said digital image from said conversion means;
input means for inputting an instruction and a password number, said instruction indicating whether an encoding process or a decoding process is to be performed for said digital image;
encoding means for transforming said digital image, stored in said first storage means, to an encoded image when the performing of the encoding process for said digital image is selected according to the instruction from said input means;
decoding means for transforming said digital image, stored in said first storage means, to a decoded image when the performing of the decoding process for said digital image is selected according to the instruction from said input means;
second storage means for storing said encoded image in accordance with a memory address determined based on said password number from said input means when the performing of the encoding process is selected, and for storing said decoded image in accordance with the memory address determined based on said password number from said input means when the performing of the decoding process is selected; and
output means for outputting either said encoded image or said decoded image, stored in said second storage means, onto a recording medium so that either an image encoded from said original image or an image decoded from said encoded image is recorded.

2. An apparatus according to claim 1, further comprising line generating means for generating a frame line surrounding an area of the encoded image from the encoding means when the performing of the encoding process is selected, the frame line indicating vertical and horizontal directions of the area of the encoded image, wherein the encoded image and the frame line are stored in the second storage means when the performing of the encoding process is selected.

3. An apparatus according to claim 2, further comprising line detecting means for detecting a frame line in the digital image stored in the first storage means when the performing of the decoding process is selected, so that said digital image is transformed to a decoded image by said decoding means, said decoded image being aligned in directions in accordance with vertical and horizontal directions indicated by the frame line detected by said line detecting means.

4. An apparatus according to claim 1, further comprising line detecting means for detecting a frame line in the digital image stored in the first storage means when the performing of the decoding process is selected, so that said digital image is transformed to a decoded image by said decoding means, said decoded image being aligned in directions in accordance with vertical and horizontal directions indicated by the frame line detected by said line detecting means.

5. An apparatus according to claim 1, wherein said encoding means divides said digital image into a plurality of blocks, a digital image of each of said blocks being encoded and rotated by said encoding means, and the thus transformed image being stored in the second storage means when the performing of the encoding process is selected, and
wherein said decoding means transforms a digital image of each of said blocks, stored in the first storage means, to a decoded image, and the thus transformed image being stored in the second storage means when the performing of the decoding process is selected.

6. An apparatus according to claim 1, wherein said encoding means transforms each pixel of said digital image to encoded pixel data, and the thus transformed image being stored in the second storage means when the performing of the encoding process is selected, and
wherein said decoding means transforms each pixel of said digital image to decoded pixel data, and the thus transformed image being stored in the second storage means when the performing of the decoding process is selected.

7. An apparatus according to claim 1, wherein said encoding means obtains predictive errors from said digital image stored in the first storage means and quantizes each of said predictive errors, so that the thus quantized predictive errors from said encoding means are stored in the second storage means for each line of said digital image.

8. An apparatus according to claim 1, wherein said input means inputs a second instruction to said apparatus, said second instruction indicating whether an encoding process for the whole area of the digital image or an encoding process for a partial area of the digital image is to be performed.

9. An apparatus according to claim 8, wherein, when the performing of the encoding process for the partial area of the digital image is selected, said encoding means transforms a first digital image of said partial area to an encoded image and synthesizes said encoded image and a second digital image of the remaining area, so that the thus produced composite image is stored in the second storage means.

10. An apparatus according to claim 1, wherein, when a plurality of input images are read by said reading means and a plurality of digital images are stored in the first storage means, said encoding means transforms each of said digital images into an encoded image and synthesizes a plurality of the thus encoded images, to produce a composite image so that the thus produced composite image is stored in the second storage means.

11. An apparatus according to claim 10, wherein, when the thus produced composite image is stored in the first storage means, said decoding means separates the composite digital image into a plurality of encoded images and transforms each of said encoded images into a decoded image, so that a plurality of the thus decoded images are stored in the second storage means.

* * * * *